United States Patent
Baker et al.

(10) Patent No.: US 8,676,504 B2
(45) Date of Patent: Mar. 18, 2014

(54) METHODS AND APPARATUS FOR COLLECTING AND USING INFORMATION REGARDING LOCATION OBJECT-BASED ACTIONS

(71) Applicant: Motorola Mobility LLC, Libertyville, IL (US)

(72) Inventors: Stephen M. Baker, Chicago, IL (US); David B. Harris, Wheaton, IL (US); Bernhard P. Weisshaar, Phoenix, AZ (US)

(73) Assignee: Motorola Mobility LLC, Libertyville, IL (US)

( * ) Notice: Subject to any disclaimer, the term of this patent is extended or adjusted under 35 U.S.C. 154(b) by 0 days.

(21) Appl. No.: 13/925,869

(22) Filed: Jun. 25, 2013

(65) Prior Publication Data

US 2013/0288638 A1 Oct. 31, 2013

Related U.S. Application Data

(63) Continuation of application No. 11/928,760, filed on Oct. 30, 2007.

(51) Int. Cl.
*G06F 19/00* (2011.01)

(52) U.S. Cl.
USPC ........... 701/522; 701/526; 701/537; 701/538; 709/228; 705/40

(58) Field of Classification Search
USPC ......... 701/461, 482, 485, 487, 491, 519, 521, 701/522, 526, 532, 537, 538; 709/228; 705/40
See application file for complete search history.

(56) References Cited

U.S. PATENT DOCUMENTS

| | | | |
|---|---|---|---|
| 5,610,821 | A | 3/1997 | Gazis et al. |
| 5,845,281 | A | 12/1998 | Benson et al. |
| 6,321,158 | B1 | 11/2001 | DeLorme et al. |
| 7,092,964 | B1 | 8/2006 | Dougherty et al. |
| 7,518,530 | B2 | 4/2009 | Ohno et al. |

(Continued)

FOREIGN PATENT DOCUMENTS

WO 2005121955 A1 12/2005

OTHER PUBLICATIONS

3GPP, Technical Specification Group Services and System Aspects; Function stage 2 description of Location Services (LCS) (Release 6) 3GPP TS 23.271 V6.13.0 (Sep. 2005).

(Continued)

*Primary Examiner* — Ronnie Mancho

(57) ABSTRACT

An embodiment of a communication system includes a client device adapted to receive a location object that includes tracer information, and to perform one or more location object-based actions using the location object. The client device stores the tracer information and location object usage information, which describes the one or more location object-based actions that have been performed using the location object. The client device also sends the stored information to a server. The system also includes the server, which is adapted to receive the location object usage information and the tracer information reported by the client device. In an embodiment, the system also includes a service provider adapted to initiate a billing event, which may include generation and transmission of a bill to a sponsor entity based on an evaluation of the location object usage information and the tracer information reported by the client device.

15 Claims, 9 Drawing Sheets

(56) References Cited

U.S. PATENT DOCUMENTS

| | | | |
|---|---|---|---|
| 7,562,387 B2 | 7/2009 | Nguyen et al. | |
| 7,751,968 B2 * | 7/2010 | Yamada et al. | 701/426 |
| 8,489,576 B2 * | 7/2013 | Harris et al. | 707/709 |
| 2001/0010541 A1 | 8/2001 | Fernandez et al. | |
| 2001/0029581 A1 * | 10/2001 | Knauft | 713/193 |
| 2002/0010757 A1 | 1/2002 | Granik et al. | |
| 2002/0019837 A1 | 2/2002 | Bainaves | |
| 2003/0212760 A1 * | 11/2003 | Chen et al. | 709/218 |
| 2003/0214780 A1 | 11/2003 | Sasaki et al. | |
| 2004/0039741 A1 * | 2/2004 | Benson et al. | 707/9 |
| 2004/0054784 A1 | 3/2004 | Busch et al. | |
| 2004/0254942 A1 | 12/2004 | Error et al. | |
| 2006/0178918 A1 | 8/2006 | Mikurak | |
| 2006/0182055 A1 | 8/2006 | Coffee | |
| 2006/0234727 A1 | 10/2006 | Ashley, Jr. et al. | |
| 2006/0247849 A1 | 11/2006 | Mohsini et al. | |
| 2006/0265495 A1 | 11/2006 | Butler et al. | |
| 2007/0016671 A1 | 1/2007 | Lee et al. | |
| 2007/0032947 A1 | 2/2007 | Yamada et al. | |
| 2008/0004958 A1 | 1/2008 | Ralph et al. | |
| 2008/0040151 A1 | 2/2008 | Moore | |
| 2008/0049971 A1 * | 2/2008 | Ramos et al. | 382/100 |
| 2008/0147480 A1 | 6/2008 | Sarma et al. | |
| 2009/0112460 A1 * | 4/2009 | Baker et al. | 701/208 |
| 2009/0254572 A1 | 10/2009 | Redlich et al. | |

OTHER PUBLICATIONS

JSR 179 Expert Group, Location API for Java 2 Micro Edition Version 1.0.1, Java Community Press, Feb. 23, 2006.

JSR 293 Expert Group, Location API 2.0 JSR 293, Version .011, Java Community Press, Jul. 2, 2007.

Open Mobile Alliance, OMA Mobile Location Service Architecture, Candidate Version 1.1—OMA-AD-MLS-V1_1-20061020-C, Oct. 20, 2006.

Open Mobile Alliance, Enabler Release Definition for Mobile Location Service (MLS) Candidate Version 1.1—OMA-ERELD-MLS-V1_1-20061020-C, Oct. 20, 2006.

Open Mobile Alliance, Mobile Location Service Requirements, Candidate Version 1.1—OMA-RD-MLS-V1_1-20060906-C, Sep. 6, 2006.

Open Mobile Alliance, Mobile Location Protocol 3.2, Candidate Version 3.2—OMA-TS-MLP-V3_-20051124-C, Nov. 24, 2005.

Open Mobile Alliance, Privacy Checking Protocol, Candidate Version 1.0—OMA-TS-PCP-V1_0-20061020-C, Oct. 20, 2006.

Open Mobile Alliance, Roaming Location Protocol, Candidate Version 1.0—OMA-TS RLP-V1_0-2006511224-C, Nov. 24, 2005.

Cuellar, J., et al., Geopriv Requirements, RFC 3693, The Internet Society, Feb. 2004.

Friedl, M., et al., Diffie-Hellman Group Exchange for the Secure Shell (SSH) Transport Layer Protocol, RFC 4419, The Internet Society, Mar. 2006.

Nokia Corporation, S60 Platform: Landmarks API Specification, Version 1.0 Jul. 11, 2005.

Nokia Corporation, S60 Platform: Landmarks Exchange Format Specification, Version 1.0 Sep. 1, 2005.

Nokia Corporation, S60 Platform: Landmarks Search API Specification, Version 1.0 Jul. 12, 2005.

Nokia Corporation, S60 Platform: Landmarks UI Add/Edit API Specification, Version 1.0 Aug. 29, 2006.

Nokia Corporation, S60 Platform: Landmarks UI Selector API Specification, Version 1.0 Aug. 29, 2006.

Open Mobile Alliance, Mobile Location Protocol (MLP) Document Type Definition Supplement, Version 3.2, 2005.

Nokia Corporation, Landmarks Database Management API Specification, Version 1.0 Jul. 15, 2005.

Nokia Corporation, Location Acquisition API Specification, Version 9.0 Nov. 11, 2004.

Open Mobile Alliance, Roaming Location Protocol (RLP) Document Type Definition Supplement, Version 1.0, 2005.

Open Mobile Alliance, Mobile Location Protocol (MLP) Document Type Definition Supplement, Version 3.0,3.1, 2002.

* cited by examiner

|  | SPONSOR A | SPONSOR B | SPONSOR C |
|---|---|---|---|
| RECEIVE | 0.05 | 0.02 | 0.50 |
| CALL | 0.30 | 0.10 | 3.00 |
| VIEW | 0.10 | 0.03 | 1.00 |
| MAPPING | 0.30 | 0.10 | 3.00 |
| SEND | 0.15 | 0.05 | 1.50 |
| SAVE | 0.10 | 0.03 | 1.00 |
| SEARCH | 0.10 | 0.03 | 1.00 |
| NAVIGATION | 0.55 | 0.19 | 5.50 |
| ARRIVAL | 0.75 | 0.25 | 7.50 | ns # METHODS AND APPARATUS FOR COLLECTING AND USING INFORMATION REGARDING LOCATION OBJECT-BASED ACTIONS

TECHNICAL FIELD

The inventive subject matter generally relates to location services provided in a networked environment, and more particularly to collecting and maintaining information regarding the usage and/or propagation of location objects through a network in which location services are provided.

BACKGROUND

Client-server communications networks commonly provide location services, which enable users to access information regarding the physical locations of potential destinations (e.g., business entities, local attractions, and other points of interest). Location services include, for example, point-of-interest search services, mapping services, and navigation services, to name a few. Generally, a user of a client device may obtain information through a location service by initiating an instance of a location service application on the client device, and inputting parameters describing the desired location information through the user interface. The location service application may then formulate a request for the information, and the client device may send the request to a network server. The network server may then obtain the requested information (e.g., through some other service provider) and return it to the client device.

Although the format of returned location information may differ, it typically includes one or more data entities that contain geographical information describing one or more physical locations. Such a location data entity may more particularly include, for example, an address and/or geographical coordinates (e.g., a latitude-longitude pair) pertaining to a physical location of a potential destination entity. A location data entity may include other information as well, such as a name and/or telephone number of a destination entity, for example. On the client device, the location service application may evaluate a returned location data entity and may cause portions of the information contained in the location data entity to be rendered on the client device.

For example, a cellular telephone user may want to obtain location information for all gas stations within a five mile radius of the telephone's current position. To obtain the desired information, the user may invoke an instance of a search application on his telephone, and may enter search parameters through the user interface (e.g., business type: gas station; search radius: five miles of current position). The search application may format and initiate transmission of a corresponding request through the network. The network may then, in turn, obtain one or more items of location-related information, and return the location-related information to the telephone. The location-related information may include, for example, the name and location of a geographical entity (e.g., a business, residence, or other point-of-interest) that meets the search criteria. The location-related information may include other information as well, such as a telephone number corresponding to the geographical entity. Using the given example, the location-related information may include the name and address of each gas station within a five mile radius, along with their telephone numbers. The search application may then cause a map to be rendered on the telephone (or may invoke a mapping application to do so), along with depictions of the gas stations pinpointed. The user may then perform some action based on the information, such as calling one of the represented gas stations, and/or initiating a navigation application to provide navigation instructions to one of the represented gas stations, for example.

Information regarding user actions performed based on received location-related information may be valuable to various parties. For example, a service provider who provided the location-related information and/or a business entity represented by a location-related information may be interested in knowing whether a user took some action based on the provided information. This knowledge may enable the service provider and/or business entity better to understand user behavior, and/or may present monetization opportunities, for example. Currently, however, there is no systematic mechanism for determining, with respect to location-related information provided to a user, whether any user action was taken or what that user action may have been. Accordingly, what are needed are methods and apparatus for a system to obtain information regarding actions that a user has taken with respect to location-related information provided to the user. Other features and characteristics of the inventive subject matter will become apparent from the subsequent detailed description and the appended claims, taken in conjunction with the accompanying drawings and this background.

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description of the inventive subject matter is merely exemplary in nature and is not intended to limit the inventive subject matter or the application and uses of the inventive subject matter. Furthermore, there is no intention to be bound by any theory presented in the preceding background or the following detailed description.

Embodiments include systems that are adapted to provide location services to users of "client" devices. More particularly, embodiments include systems, methods, and apparatus for enabling the collection of information regarding actions performed by client devices using "location objects" that are provided by a system in conjunction with a location service. As will be described in detail below, collection of this information is facilitated, in various embodiments, by providing "tracer information" as a part of each location object, and by adapting the client devices to store and report, to the system, indications of the actions performed by the client devices using the location objects. As will also be described in detail below, the system may evaluate the information reported by the client devices to better determine user behaviors and/or for monetization purposes, in various embodiments.

Figure 1:
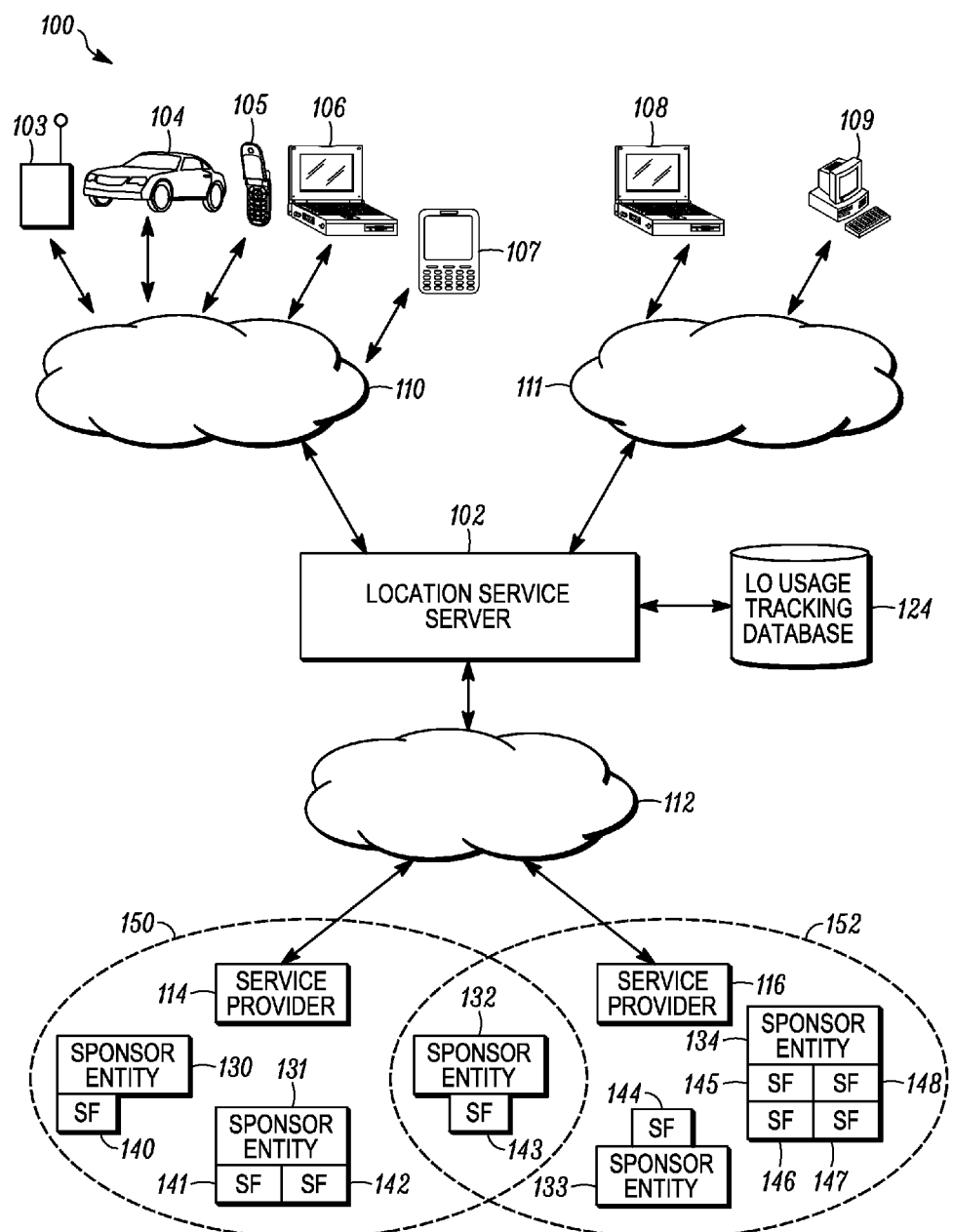
FIG. 1 is a simplified diagram of a communication system adapted to provide one or more location services to users of the communication system, in accordance with an example embodiment.

FIG. 1 is a simplified diagram of a communication system 100 adapted to provide one or more location services to users of the communication system 100, in accordance with an example embodiment. As used herein, the term "location service" means a centralized or distributed software entity adapted to perform, in response to specific requests, one or more processes relating to the identification of one or more physical locations. For example, but not by way of limitation, a location service may be a point-of-interest (POI) search service, a mapping service or a navigation service, although other types of services also may be considered to be location services. A location service may be implemented through a collection of software components (e.g., location applications and other programs), which are executed by various system entities. As used herein, the term "location application" means a software application that is resident on a system entity (e.g., a client device or a server), and that executes one or more functions available in a location service. For example, but not by way of limitation, a location application may include client-side and/or server-side portions of a location search application (e.g., a point-of-interest (POI) search application), a mapping application, and/or a navigation application, although other types of applications also may be considered to be location applications.

Communication system 100 includes various system entities, which include at least one location service server 102 and a plurality of client devices 103, 104, 105, 106, 107, 108, 109. Communication system 100 also may include one or more service providers 114, 116, each of which may have some type of business relationship with one or more sponsor entities 130, 131, 132, 133, 134. As used herein, the term "system entity" means a software, firmware, hardware or combined entity, which is adapted to communicate with other system entities. A system entity may include an entity that performs processing and/or data storage functions with respect to signals or messages that are communicated between it and one or more other system entities. Location service server 102, client devices 103-109, service providers 114, 116, location object usage tracking database 124, and/or portions thereof may be considered "system entities," as that term is used herein. Although the description herein separately describes various processes performed between location service server 102 and service providers 114, 116, it is to be understood that some or all of the processes performed by location service server 102 may be performed by a service provider 114, 116, and vice versa. In addition, although location service server 102 and service providers 114, 116 are illustrated as distinct system entities, these entities may be physically and/or functionally combined, in various embodiments.

Client devices 103-109 may form a portion of any one or more electronic devices selected from a group of devices that includes, but is not limited to, cellular telephones, radios, pagers, personal data assistants (PDAs), personal navigation devices (PNDs), mobile computer systems (e.g., automotive and airplane computer systems), and computers (e.g., laptop, notebook, and desktop computers), to name a few. Client devices 103-109 may be portable or stationary electronic devices, and may be adapted to communicate with networks 110, 111 using various wired and/or wireless communication technologies. In addition, client devices 103-109 are adapted to execute one or more location applications, as will be described in more detail below.

Location service server 102 may include one or more computers, data storage devices, and/or other hardware, which are adapted to execute one or more server processes (e.g., "servlets") and/or to store data relevant to server operations. Location service server 102 is adapted to communicate with client devices 103-109 and at least one service provider 114, 116 over one or more wired or wireless networks 110, 111, 112. Networks 110-112 may include, for example, packet switched and/or circuit switched networks, and may further include one or more of the internet, a personal area network (PAN), a local area network (LAN), a wide area network (WAN), a cellular telephone network, a radio network, a satellite communications network, a public switched telephone network (PSTN), and/or any of a variety of other types of networks adapted to enable the interchange of data between various system entities. Networks 110-112 may be adapted to exchange data between the system entities using any of a variety of wired or wireless communications protocols, a discussion of which is outside the scope of the present application. Although three networks 110-112 are illustrated in FIG. 1, more or fewer networks may be included in communication system 100.

In the process of providing location services and/or executing location applications, "location objects" may be produced within communication system 100, and exchanged between system entities. As used herein, the terms "location object" and "LO" mean a distinct and portable data structure having a defined format that includes information regarding the geographical location of an entity (e.g., a sponsor entity, residence, physical device or point-of-interest). A location object may include other information, as well, including a telephone number and entity name, for example. In an embodiment, a location object also includes a location object tracer. As used herein, the terms "location object tracer" and "tracer" refer to a portion of a location object that identifies one or more system entities associated with the origin and/or content of the location object. As used herein, "tracer information" means the information that is stored within a location object tracer. In an embodiment, a tracer may be "protected" at various times, meaning that the tracer may be in an encrypted format, or may include some information (e.g., an integrity key) that enables a determination to be made whether the content of the tracer has been altered by an unauthorized source. Embodiments of location objects and tracers will be described in detail later, in conjunction with FIGS. 5-6.

Client devices 103-109 include electronic devices adapted to request location information during the process of accessing location services through the communication system 100. More particularly, a client device 103-109 is adapted to generate and send, over a network 110, 111, a request for location information to location service server 102. As used herein, the term "location information" means information regarding the geographical location of an entity (e.g., a business, residence, device or point-of-interest). Location information may include, for example, a physical address, geographic coordinates (e.g., a latitude-longitude pair), and/or codes describing bounded geographical areas (e.g., block identifiers, grid identifiers, cities, counties, states, countries or other boundary identifiers). In an embodiment, location service server 102 is adapted to receive location information requests from client devices 103-109, obtain location objects corresponding to the requests, and return the location objects to the client devices 103-109.

In various embodiments, location service server 102 may generate a location object itself, or may obtain a location object corresponding to a location information request from a service provider 114, 116 or other system entity. Generating or obtaining location objects may include performing processes (e.g., formulating and/or performing a POI search) and/or performing data accesses based on the location information request. During generation of a location object or upon receipt of a location object (e.g., from a service provider 114, 116), location service server 102 may add tracer information to the location object, and send the server-modified location object to the client device 103-109. In an embodiment, location service server 102 may protect the tracer (e.g., through encryption, inclusion of an integrity key, or otherwise) prior to sending the location object to a client device 103-109.

Client devices 103-109 are adapted to receive location objects from location service server 102 or other system entities (e.g., other client devices 103-109 and/or service providers 114, 116), and to store received location objects within the client device's local memory. A client device 103-109 additionally may "use" a received location object by performing one or more actions relating to the location object. For example, along with the action of storing a location object on the client device 103-109, a client device 103-109 may place a call to an entity identified in a location object, map the location of an entity identified in a location object, and/or initiate a navigation application to provide driving instructions to an entity identified in a location object, among other things.

Client devices 103-109 are adapted to collect and store information regarding their usage of received location objects (referred to herein as "location object usage information") along with the tracer information associated with the location objects that are used. As used herein, the term "location object usage information" means a collection of data, which describes one or more location object-based actions that have been performed on one or more location objects that have been received by (e.g., downloaded by) and stored on a client device 103-109 in temporary storage (e.g., volatile memory) and/or persistent storage (e.g., non-volatile memory). As used herein, the term "location object-based action" means a system-recognized action performed by a client device 103-109 using a location object that has been received by the client device 103-109. Examples of various location object-based actions will be given later, in conjunction with a discussion of FIG. 3.

Location object usage information and tracer information may be stored on a client device 103-109 within a client-side location object usage log, in an embodiment, which is also stored within the client device's local memory. As used herein, the term "client-side location object usage log" means a collection of location object usage information and tracer information, which is stored on a client device 103-109, and which describes one or more location object-based actions that have been performed on one or more location objects that have been received by the client device 103-109, along with the tracer information associated with the location objects with which the location object-based actions have been performed. In an embodiment, a client-side location object usage log includes one or more location object usage records, each of which includes information regarding one or more location object-based actions performed on a particular location object and the associated tracer information. Embodiments of client-side location object usage logs will be described in detail later, in conjunction with FIG. 7.

Along with collecting and storing location object usage information and tracer information, a client device 103-109 also may be adapted to report that information to other system entities (e.g., location service server 102). Client devices 103-109 may send client location object usage information and tracer information to location service server 102 in response to a request from location service server 102, or in response to some other reporting event, as will be described later. In an embodiment, a client device 103-109 may report location object usage information by generating a client location object usage report, and sending that report to location service server 102. As used herein, the term "client location object usage report" means a collection of location object usage information and tracer information retrieved from a client-side location object usage log, which is in a message format suitable for sending over a network 110, 111. In an embodiment, a client location object usage report may be sent to location service server 102 in the form of one or more messages or data blocks.

In an embodiment, location service server 102 is adapted to receive location object usage information and tracer information (e.g., in the form of client location object usage reports) from client devices 103-109, and to consolidate the received location object usage information and tracer information by storing the received location object usage information and tracer information in a location object usage tracking database 124. Location object usage tracking database 124 may include a centralized or distributed data storage system, and may be implemented on the same or different hardware from location service server 102. In an embodiment, the location object usage tracking database 124 is adapted to store consolidated location object usage information and tracer information in a server-side location object usage log. As used herein, the term "server-side location object usage log" means a collection of location object usage information and tracer information, which is stored on or accessible to location service server 102, and which describes one or more location object-based actions that have been performed on one or more location objects by one or more client devices 103-109, along with the tracer information associated with those location objects. A server-side location object usage log may be in the form of a relational database or a flat file, in various embodiments.

In an embodiment, location service server 102 is also adapted to send portions of the consolidated location object usage information and tracer information to service providers 114, 116 or other system entities. Location service server 102 may send portions of the consolidated location object usage information and tracer information to a service provider 114, 116 in response to a request from the service provider 114, 116, or in response to some other reporting event, as will be described later. In an embodiment, location service server 102 may report portions of the consolidated location object usage information and tracer information by generating a server location object usage report, and sending that report to a service provider 114, 116. As used herein, the term "server location object usage report" means a collection of location object usage information and tracer information retrieved from a server-side location object usage log, which is in a message format suitable for sending over a network 112. In an embodiment, a server location object usage report may be sent to a service provider 114, 116 in the form of one or more messages or data blocks.

Service providers 114, 116 include entities that are adapted to generate or obtain location objects in response to requests for location information from other system entities (e.g., location service server 102 or client devices 103-109). In an embodiment, a service provider 114, 116 is a distinct system entity from the location service server 102. In an alternate embodiment, a service provider 114, 116 and a location service server 102 may be implemented together. In an embodiment, a service provider 114, 116 may include a search engine or other processing algorithm, which is adapted to identify one or more location objects based on information within a location information request.

Each service provider 114, 116 may have business relationships with one or more sponsor entities 130-134, in an embodiment, as indicated by ovals 150, 152, in an embodiment. In an embodiment, this may mean that a service provider 114, 116 and a sponsor entity 130-134 have mutual business obligations (e.g., a contractual relationship), such as a service provider's obligation to provide, for monetary or other compensation, location objects for sponsor locations in response to location information requests. In another embodiment, a service provider 114, 116 may be more directly related to a sponsor. For example, a service provider 114, 116 may include a server adapted to host a sponsor entity's website and to provide location objects for sponsor locations in response to location information requests received through the website.

As used herein, the terms "sponsor entity" and "sponsor" mean a business entity that is located at and/or has a business interest in one or more sponsor facilities (SF) 140, 141, 142, 143, 144, 145, 146, 147, 148, where a physical location of a sponsor facility 140-148 may be represented in a location object. As used herein, the term "sponsor facility" means an actual physical facility (e.g., land areas, edifices, stores, warehouses, restaurants, offices or other non-portable physical objects). In some cases, a sponsor entity 130-134 and a sponsor facility 140-148 may be co-located, and in other cases, a sponsor entity 130-134 and a sponsor facility 140-148 may be distinct entities and/or physically distinct (e.g., a sponsor entity may be a corporation, and sponsor facilities may include multiple retail locations owned by the corporation).

In an embodiment, by virtue of the business relationships between them, each service provider 114, 116 may maintain location objects associated with sponsor entities 130-134 and/or sponsor facilities 140-148. Each service provider 114, 116 also may select certain ones of the maintained location objects based on location information requests received from location service server 102, and may send the selected location objects to location service server 102 in response to the requests.

One example of the functionality of communication system 100 follows. Assume a user of a client device 103-109 wants to obtain location information for gas stations located within a five mile radius of the user's current location (i.e., the client device's current location). The user may initiate a location application on the client device 103-109, which is adapted to enable the user to enter the search criteria. The location application may then generate a request for location information, and the client device 103-109 may send the location information request to location service server 102. Location service server 102 may, in turn, send a location information request to a service provider 114, 116, which is adapted to determine one or more location objects associated with sponsor facilities 140-148 that meet the search criteria (e.g., gas stations within a five mile radius of the client device's current location). The service provider 114, 116 may then send the location objects to the location service server 102, and the location service server 102 may send the location objects to the client device 103-109.

The client device 103-109 may store the location objects, and then may perform one or more additional actions with respect to one or more of the location objects. Assume, for example, that the client device 103-109 received four location objects in response to its initial location information request, and each location object includes the name and location of a different gas station. One action that the client device 103-109 may take is to display a list of the gas stations, with each item of the list corresponding to one of the four received location objects. Another action that the client device 103-109 may take, via a mapping application, is to display a map that indicates the locations of each of the gas stations. Another action that the client device 103-109 may take, in response to user inputs, is to initiate a phone call to one of the gas stations using a telephone number included within the location object for that gas station. Yet another action that the client device 103-109 may take, via a navigation application, is to provide navigation instructions to instruct the user how to navigate to one of the gas stations. Ultimately, the navigation application may issue an arrival instruction if and when the navigation application determines that the user has arrived at the gas station.

Service providers 114, 116 and sponsor entities 130-134 may be interested in obtaining information regarding the use, by client devices 103-109, of location objects which the service providers 114, 116 have provided. This information may be useful in determining user behavior, for example, and/or for monetizing the use of location objects. For example, if a service provider 114, 116 had knowledge that a user has "used" a particular location object, the service provider 114, 116 may be able to charge a fee to the sponsor entity 130-134 based on the type of use and/or the type of sponsor facility 140-148 represented in the location object.

For example, when a use involves merely storing a location object on a client device, a first fee (or no fee) may be charged. Conversely, when a use involves receiving an arrival instruction from a navigation application, which implies that the user actually has gone to the sponsor facility 140-148 represented in the location object, a second, higher fee may be charged. In addition, a service provider 114, 116 may have a first fee schedule for a first sponsor entity 130-134 or a first type of sponsor facility 140-148 (e.g., a fast food restaurant) and a second, higher fee schedule for a second sponsor entity 130-134 or a second type of sponsor facility 140-148 (e.g., a luxury car dealership).

Figure 2:
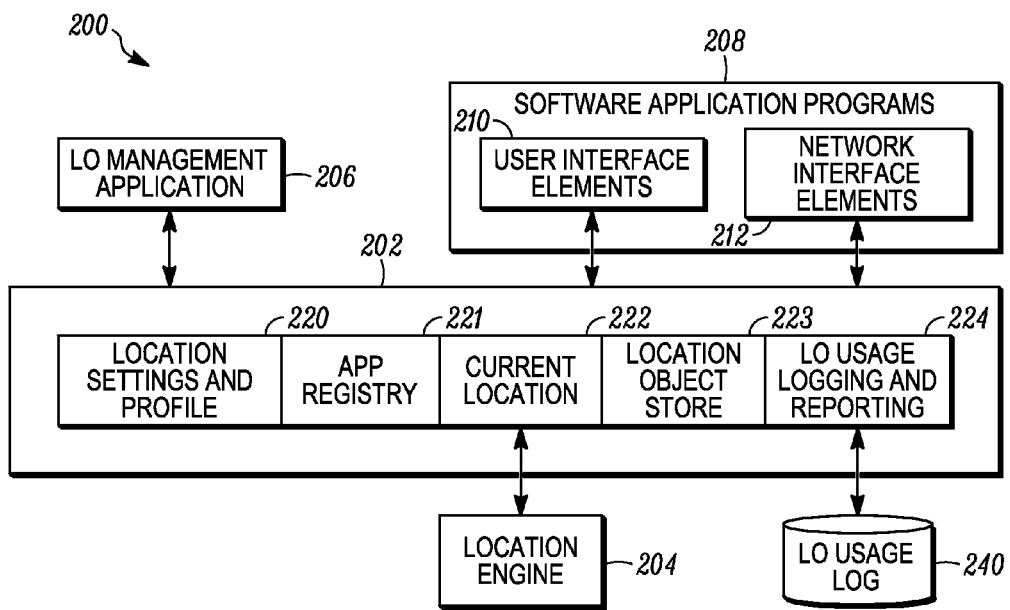
FIG. 2 is a functional block diagram of a client-side, location services software architecture, in accordance with an example embodiment.
Figures 12, 13:
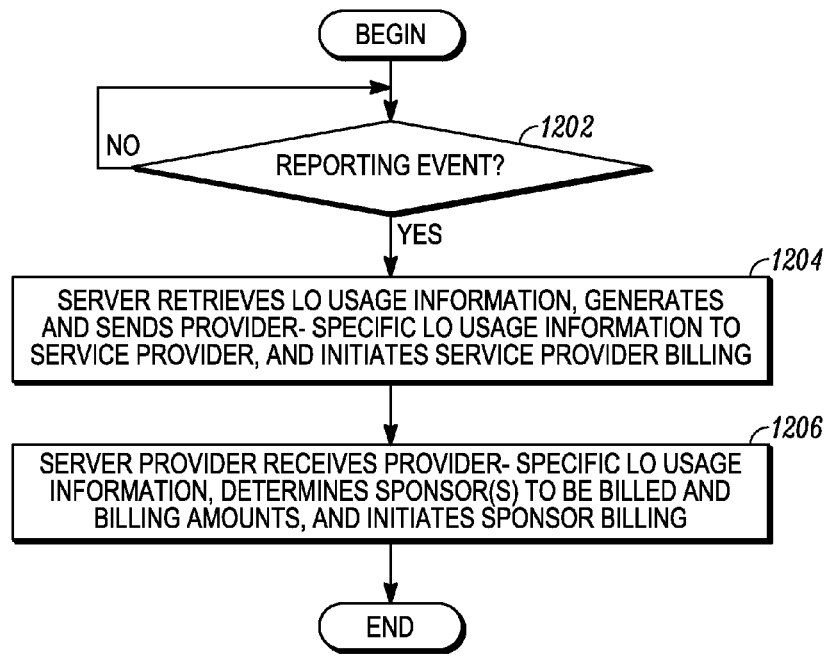
FIG. 12 is a flowchart of a method for a server to provide information to a service provider, which describes location object-based actions performed by one or more client devices, in accordance with an example embodiment.
FIG. 13 is an example of a tiered billing schedule that may be applied by a service provider billing processor, in accordance with an example embodiment.
Figure 14:
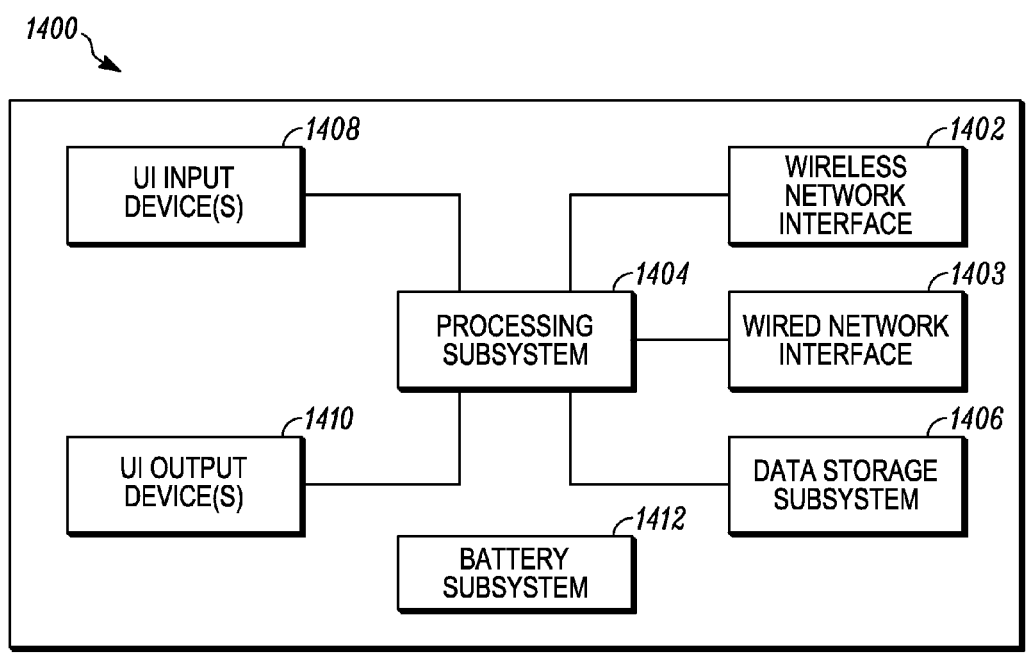
FIG. 14 is a simplified block diagram of a client device, in accordance with an example embodiment.

Additional details regarding various embodiments will now be described. More particularly, FIG. 2 is a functional block diagram of a client-side, location services software architecture, in accordance with an example embodiment. FIGS. 3-7 illustrate additional details regarding a client device obtaining location objects and logging location object usage. FIGS. 8-11 illustrate additional details regarding a client device reporting location object usage to a location service server, and FIGS. 12-13 illustrate additional details regarding a location service server reporting location object usage to a service provider or other entity, and either or both the location service server or the service provider initiating billing events. Finally, FIG. 14 illustrates a simplified block diagram of a client device.

FIG. 2 is a functional block diagram of a client-side software architecture 200 adapted to provide location services, store location object usage information and tracer information, and report location object usage information and tracer information, in accordance with an example embodiment. Executable code associated with elements of software architecture 200 may be stored within one or more memory subsystem of a client device, and executed by one or more processing subsystems of the client device, in an embodiment.

Software architecture 200 includes a core component 202 adapted to provide features relating to location services, as will be explained in more detail below. In addition, in an embodiment, software architecture 200 includes various "peripheral components," which interface with core component 202. These peripheral components include, in an embodiment, a location engine 204, a location object management application 206, and one or more software applications 208, at least some of which are adapted to process location objects.

Location engine 204 includes hardware, firmware, and/or software adapted to determine a current location of the client device. For example, but not by way of limitation, location engine 204 may include a global positioning system (GPS) interface, which is adapted to receive GPS satellite signals in order to determine the client device's location (e.g., via triangularization and other GPS techniques). In addition or alternately, location engine 204 may include a Bluetooth-enabled GPS interface, which is adapted to receive Bluetooth signals that provide GPS-determined indications of the client device's location. Location engine 204 also or alternately may determine the client device's location based on the devices "location" within a network (e.g., a cell within a cellular network), based on triangularization techniques using non-GPS signals (e.g., cellular or radio signals), based on sensor information (e.g., telematics systems, accelerometers, rotation sensors, velocity sensors), and/or based on location information received from other sources (e.g., a network-determined location sent to the client device).

Location object management application 206 includes a software application adapted to provide the means (e.g., interactive display screens) for a user of the client device to access and initiate various functions relating to location objects. For example, but not by way of limitation, location object management application 206 may cause the client device to display a screen that includes a menu of selectable options relating to location objects. These options may include, for example, options to save a location object on the client device in persistent storage ("save option"), to view details of a location object ("view option"), to edit a location object ("edit option"), and or to send a location object to another system entity ("send option"). Location object management application 206 also may enable a user to select a saved location object, and to initiate the performance of a location object-based action on the selected location object, in an embodiment. For example, when a user selects a particular location object, location object management application 206 may initiate execution of a client-side location application, and may pass the selected location object (or a pointer or address thereto) to the application. In addition, location object management application 204 may provide one or more other features or selectable options, which may be displayed in conjunction with the menu or may be selectable through the menu. Additional features may include, for example, a current location display feature (e.g., causes the client device's current location to be determined and/or displayed), setup features (e.g., enables the displays to be customized), information management features (e.g., enabling location information and/or location objects to be organized and/or characterized), and/or information display features (e.g., enabling subsets of location information and/or location objects to be displayed, such as "recent locations," for example).

Software application programs 208 include one or more executable software programs, at least some of which are adapted to provide a user interface, and to receive, send, store, and/or process location objects. For example, but not by way of limitation, software application programs 208 may include one or more of a mapping application, a point-of-interest search application, a point-to-point direction application, a navigation application, a geocoding application, a reverse geocoding application, a contacts application, a messaging application (e.g., a short message service (SMS) application and/or a multimedia messaging service (MMS) application), a browser application, other third-party provider applications, and/or other applications.

In an embodiment, at least some of software application programs 208 may include user interface (UI) elements 210 and network interface elements 212. UI elements 210 include portions of the software application programs 208, which produce the means for a user of the client device to view and enter information through the user interface (e.g., the display, touchscreen, pointing device, keypad, speaker, and microphone, for example). Network interface elements 212 include portions of the software application programs 208, which facilitate communication between the client device and a server (e.g., location service server 102, FIG. 1) over a network with which the client device communicates. Communication with a server may be performed, for example, to send location objects to the server, to receive location objects from the server, to send location object usage information and tracer information to the server, to send or receive other client-server communications, and/or to invoke the server to perform certain functions of a location service (e.g., computationally intensive and/or memory intensive functions) and to return results of the server-performed functions back to the client device (e.g., a map). Network interface elements 212 also may facilitate communication between the client device and other client devices, for example, when location objects are being shared between the client devices (e.g., using a messaging application such as SMS and/or MMS). Although segmentation of a software application 208 into a UI element 210 and a network interface element 212 is not essential, such segmentation may enable the software application 208 to be more easily modified to comply with the user interface requirements specified by different service providers, wireless carriers, and/or device manufacturers. For example, in order to comply with the user interface requirements of a particular service provider, wireless carrier, and/or device manufacturer, a software application programmer may design the UI element 210 of a software application 208, without affecting the network interface element 212. In addition, segmentation may enable a software application 208 to be more easily modified to communicate over various networks. For example, in order to communicate according to a protocol that is compatible with a particular network, a software application programmer may design the network interface element 212 of a software application 208, without affecting the UI element 210.

As mentioned previously, location engine 204, location object management application 206, and software application programs 208 are adapted to interface with core component 202. Core component 202 may be a platform-independent entity, which may be executed in conjunction with a variety of different operating systems on a variety of different types of client devices. In an embodiment, core component 202 includes or is adapted to call various features, including a location settings and profile feature 220, an application registry feature 221, a current location feature 222, a location object store feature 223, and a location object support feature 224. Each of these features 220-224 is an element of core component 202, in an embodiment. In other embodiments, any one or more of features 220-224 may be implemented in software programs that are distinct from core component 202, and/or may be excluded altogether. In still other embodiments, any one or more of features 220-221 may be combined together.

Location settings and profile feature 220 is adapted to maintain settings and profile information, and in some cases, to facilitate editing of settings and profile information. For example, location settings and profile feature 220 may be adapted to interface with location object management application 204 and/or software application programs 208 to provide and/or update settings and/or profile information. Settings may include, among other things, information that enables the network interface elements 212 of the software application programs 208 to communicate with a server adapted to provide location services (e.g., a uniform resource locator for location service server 102, FIG. 1). Profile information may include, among other things, search preference parameters that may be specified by a user. For example, profile information may include default search settings (e.g., default search radius), navigation preferences (e.g., avoid tollways), and mapping preferences (e.g., default zoom settings), among other things.

Application (APP) registry feature 221 is adapted to enable applications (e.g., software application programs 208) to register themselves with the core functionality (e.g., to make themselves "known" to the core functionality). In addition, application registry feature 221 facilitates intercommunication (e.g., of location objects) between registered applications. For example, in an embodiment, the application registry feature 221 may enable a messaging application, which has received an SMS message that includes a location object, to pass the location object to a mapping application, which may then cause a map to be displayed, which depicts a location represented in the location object.

Current location feature 222 is adapted to interface with location engine 204, in order to obtain the client device's current location for use by other applications (e.g., a mapping application and/or navigation application). In addition, in an embodiment, current location feature 222 may be adapted to generate a location object that represents the client device's current location. That location object may be accessed by other applications and/or sent to other system entities.

Location object store feature 223 is adapted to store location objects that are received by the client device in the client device's non-volatile memory, and to retrieve and provide previously stored location objects when they are requested by a software application program 208 or other software component of the client device. In an embodiment, a user also may initiate access to location objects by manipulating the user interface provided by location object management application 204, for example. Once accessed, the user may "use" the location object by initiating, through the user interface, further actions to be performed with respect to the location object (e.g., map and/or provide navigation instructions to the location represented in the location object).

Location object usage logging and reporting feature 224 is adapted to log the usage of location objects by storing information regarding the usage (e.g., location object usage information and tracer information) in location object usage log 240. In addition, in an embodiment location object usage logging and reporting feature 224 is adapted to report the location object usage to a server (e.g., location service server 102, FIG. 1), by retrieving location object usage information and tracer information from the location object usage log 240, and generating and sending client location object usage reports over the network. In an embodiment, location object usage log 240 includes a buffer, which includes location object usage information and tracer information for one or more location objects that have been received by the client device.

Figure 3:
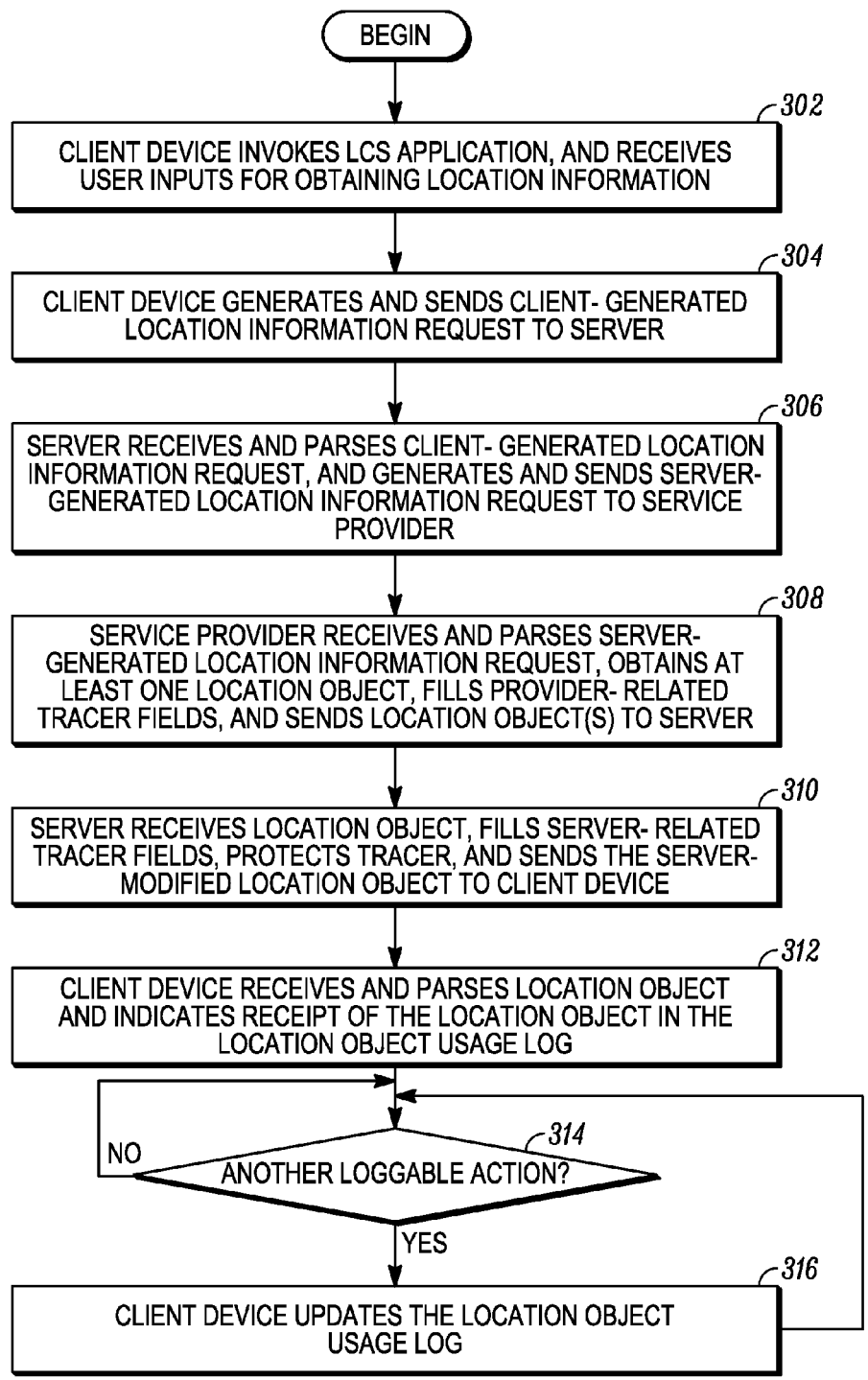
FIG. 3 is a flowchart of a method for requesting location information, generating and returning location objects, and logging location object usage, in accordance with an example embodiment.

FIGS. 3-7 illustrate additional details regarding a client device obtaining location objects and logging location object usage. More particularly, FIG. 3 is a flowchart of a method for requesting location information, generating and returning location objects, and logging location object usage, in accordance with an example embodiment. For enhanced understanding, FIG. 3 should be viewed in conjunction with FIG. 4, which is a communication flow diagram illustrating messages exchanged between system entities during the process of obtaining a location object, in accordance with an example embodiment.

Referring first to FIG. 3, the method may begin, in block 302, when a client device invokes a software application (e.g., location object management application 204 and/or software application program 208, FIG. 2), which is adapted to provide a client-side portion of a location service. Such an application may be referred to generally herein as a location service application or "LCS" application. In an embodiment, the software application may include a user interface element (e.g., UI element 210, FIG. 2), which may provide one or more user interface prompts adapted to enable the user to input or indicate parameters for obtaining location information. The software application may receive the user-specific parameters through the provided user interface. Using a previously given example, a user may invoke a point-of-interest search application directly or through another program (e.g., location object management program 204, FIG. 2), and may input parameters that specify that the user would like the identities and locations of gas stations within a five mile radius of the user's current location (e.g., the client device's current location).

In block 304, the client device generates a client-generated location information request, which indicates the parameters. The client device may then send the client-generated location information request to a server (e.g., location service server 102, FIG. 1), as indicated by client-generated location information request message 402 (FIG. 4) being sent from a client device to a server.

In an embodiment, in block 306, the server receives and parses the client-generated location information request. The server may be adapted to act as a proxy, and to perform some computational or data intensive functions related to the location service for which the location information request relates. In addition, the server may be adapted to generate or retrieve location objects that may fulfill the request. However, if the server is not able to generate or retrieve location objects that may fulfill the request, the server may generate and send a server-generated location information request to a service provider (e.g., service provider 114, 116, FIG. 1) or other system entity which is adapted to generate or retrieve such location objects. The server-generated location information request, which is indicated by server-generated location information request message 404 (FIG. 4) may include substantively the same parameters as the client-generated location information request, although the format of the server-generated location information request should be consistent with the network and messaging protocols for communication between the server and a service provider.

In block 308, the service provider receives and parses the server-generated location information request, and obtains at least one location object that fulfills the request, in an embodiment. In some cases, the service provider may generate the location objects, and in other cases, the service provider may obtain the location objects from other sources. As discussed previously, a location object includes location information (e.g., an address and/or geographical coordinates) and, in an embodiment, also includes a location object tracer, which includes tracer information that identifies one or more system entities associated with the origin and/or content of the location object. Along with location information and tracer information, a location object may include other information, as well.

Figure 5:
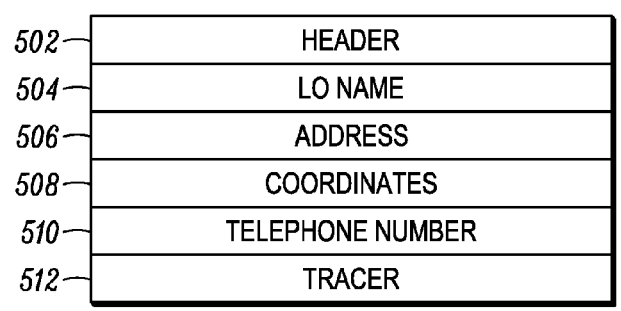
FIG. 5 is a diagram of a location object, in accordance with an example embodiment.

FIG. 5 is a diagram of a location object 500, in accordance with an example embodiment. In an embodiment, location object 500 is a data entity that includes at least one or more location information fields (e.g., address field 506 and geographical coordinates field 508) and tracer 512. In various other embodiments, location object 500 may include one or more additional fields, as a header field 502, location object name field 504, and telephone number field 510, for example. In other embodiments, location object 500 may include more, fewer or different fields. An entity that generates a location object (e.g., establishes the location object as a data entity and inserts data in at least the header field 502, location object name field 504, and location information fields) is referred to herein as a "content provider." A content provider may be, for example, a service provider (e.g., service provider 114, 116, FIG. 1), a location service server (e.g., location service server 102, FIG. 1), a client device (e.g., client device 103-109, FIG. 1), a processing system associated with a sponsor entity (e.g., sponsor entity 130-134, FIG. 1), or another system entity.

Header field 502 may include, for example, information that enables a processing element to determine the type of entity that location object 500 is, and may additionally include information regarding the size and format of location object 500, among other things. Location object name field 504 may include an indication of a unique or non-unique name of the entity (e.g., the business entity or the individual name) associated with location object 500. Address field 506 may include a physical address corresponding to the location represented by location object 500. Geographical coordinates field 508 may include geographical coordinates (e.g., a latitude-longitude pair) corresponding to the location represented by location object 500. Telephone number field 510 may include a telephone number of the entity (e.g., the business entity or individual name) corresponding to the location represented by location object 500. Finally, tracer 512 includes a protected or unprotected tracer, which as described previously, identifies one or more system entities associated with the origin and/or content of location object 500.

Although FIG. 5 illustrates a location object having particular fields arranged in a particular order, it is to be understood that, in other embodiments, a location object may have a substantially different format from that illustrated in FIG. 5 (e.g., a V-card format, XML format or other format).

Figure 6:
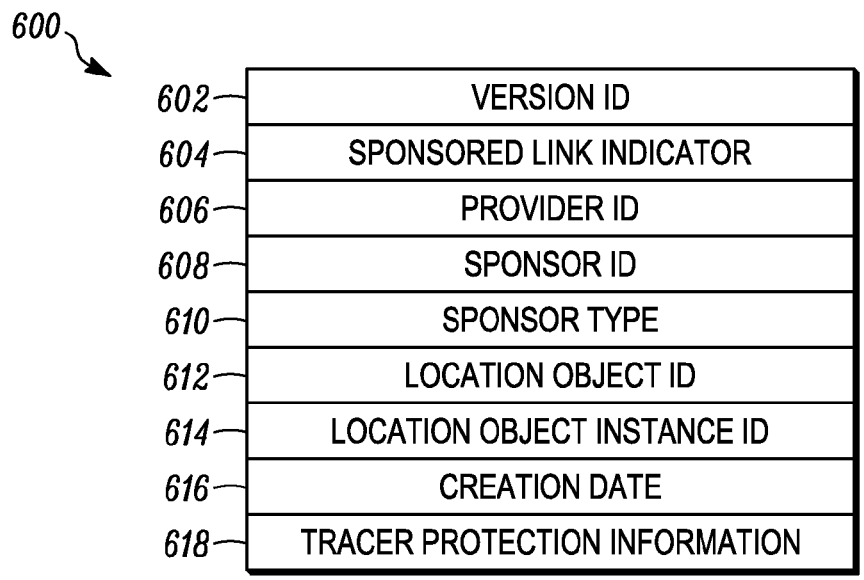
FIG. 6 is a diagram of a location object tracer, in accordance with an example embodiment.

FIG. 6 is a diagram of a location object tracer 600, in accordance with an example embodiment. In an embodiment, location object tracer 600 includes at least a provider identification (ID) field 606, a sponsor ID field 608, and a location object ID field 612. In various other embodiments, location object tracer 600 may include one or more of a version ID field 602, sponsored link indicator field 604, a sponsor type field 610, a location object instance ID field 614, a creation date field 616, and one or more tracer protection information fields 618. Each of these fields will briefly be described below.

Version ID field 602 may include version information (e.g., a version number) indicating the "version" of the tracer structure and/or tracer processing requirements. For example, the system may be adapted to implement various tracer structures, each potentially having different sizes, different fields, different arrangements of fields, and/or different field characteristics (e.g., data formats). In an embodiment, the location service server (e.g., location service server 102, FIG. 1) or another system entity (e.g., a service provider 114, 116, FIG. 1) may enter data into this field to indicate the version of the tracer 600. This information, when later accessed, enables a system entity to determine how to parse the tracer 600, and/or may indicate other characteristics of the tracer 600 (e.g., whether or not encryption or other forms of protection have been applied to the tracer), which affect the way that the tracer 600 is generated and/or processed. In an embodiment, version information is stored in version ID field 602 by a location service server (e.g., location service server 102, FIG. 1), although it alternatively may be stored by a service provider (e.g., service provider 114, 116, FIG. 1), a content provider or another system entity. Desirably, the version ID field 602 is not encrypted, in an embodiment in which other portions of tracer 600 are encrypted. In an alternate embodiment, the version ID field 602 may be encrypted.

Sponsored link indicator field 604 may include information (e.g., a binary value) indicating whether or not the location of a sponsor facility (e.g., sponsor facility 140-148, FIG. 1) is represented by the location object with which the tracer 600 is associated. As mentioned previously, a location object may represent location information for a sponsor entity (e.g., a sponsor facility 140-148, FIG. 1), a residence, another physical device (e.g., a client device 103-109, FIG. 1) or some other point-of-interest. As will be described in detail later, certain monetization opportunities may exist when a location object represents location information for a business entity. Accordingly, inclusion of an indication, in sponsored link indicator field 604, of whether or not the location information represents a location of a sponsor facility may enable the system readily to determine whether or not to perform processes relating to the location object (e.g., whether or not to log and/or report location object-based actions, and/or whether or not to initiate billing actions based on the location object). In an embodiment, a sponsored link indicator is stored in sponsored link indicator field 604 by a location service server (e.g., location service server 102, FIG. 1), although it alternatively may be stored by a service provider (e.g., service provider 114, 116, FIG. 1), a content provider or another system entity. Desirably, the sponsored link indicator field 604 is not encrypted, in an embodiment in which other portions of tracer 600 are encrypted, to enable a client device to read the sponsored link indicator. In an alternate embodiment, the sponsored link indicator field 604 is encrypted.

Provider ID field 606 may include a provider ID, which identifies an entity (e.g., a service provider 114, 116, FIG. 1) from which the location object was obtained. In some cases, the entity identified in the provider ID field 606 may actually generate the location object. In other cases, the entity identified in the provider ID field 606 may retrieve the location object from another system entity and/or from a database. In an embodiment, a provider ID is stored in provider ID field 606 by a location service server (e.g., location service server 102, FIG. 1), although it alternatively may be stored by a service provider (e.g., service provider 114, 116, FIG. 1), a content provider or another system entity. Desirably, the provider ID field 606 is encrypted, in an embodiment in which portions of tracer 600 are protected using encryption. In an alternate embodiment, the provider ID field 606 may not be encrypted.

Sponsor ID field 608 may include a sponsor ID, which identifies a sponsor entity (e.g., a sponsor entity 130-134, FIG. 1) having a sponsor facility (e.g., a sponsor facility 140-148, FIG. 1) whose location is represented in the location object. In an embodiment, a sponsor ID is stored in sponsor ID field 608 by a content provider, although it alternatively may be stored by a location service server (e.g., location service server 102, FIG. 1), a service provider (e.g., service provider 114, 116, FIG. 1) or another system entity. Desirably, the sponsor ID field 608 is encrypted, in an embodiment in which portions of tracer 600 are protected using encryption. In an alternate embodiment, the sponsor ID field 608 may not be encrypted.

Sponsor type field 610 may include a sponsor type indicator, which provides for classifying the sponsor entity (e.g., a sponsor entity 130-134, FIG. 1) and/or sponsor facility (e.g., a sponsor facility 140-148, FIG. 1) associated with the location object. In an embodiment, as will be described later, monetization opportunities that include billing sponsor entities based on location object-based actions performed by client devices may determine billing amounts based on the type of sponsor entity and/or the type of sponsor facility. In an embodiment, a type indicator is stored in sponsor type field 610 by a service provider (e.g., service provider 114, 116, FIG. 1), although it alternatively may be stored by a location service server (e.g., location service server 102, FIG. 1), a content provider or another system entity. Desirably, the sponsor type field 610 is encrypted, in an embodiment in which portions of tracer 600 are protected using encryption. In an alternate embodiment, the sponsor type field 610 may not be encrypted.

Location object ID field 612 may include a location object ID, which enables a determination of which particular sponsor facility (e.g., sponsor facility 140-148, FIG. 1) the location information within the location object pertains. Accordingly, a location object ID may be unique for different physical facilities. In an embodiment, a location object ID is stored in location object ID field 612 by a content provider, although it alternatively may be stored by a location service server (e.g., location service server 102, FIG. 1), a service provider (e.g., service provider 114, 116, FIG. 1) or another system entity. Desirably, the location object ID field 612 is encrypted, in an embodiment in which portions of tracer 600 are protected using encryption. In an alternate embodiment, the location object ID field 612 may not be encrypted.

Location object instance ID field 614 may include a location object instance ID, which uniquely identifies the particular instance of the location object. In an embodiment, a location object instance ID is stored in location object instance ID field 614 by a service provider (e.g., service provider 114, 116, FIG. 1), although it alternatively may be stored by a location service server (e.g., location service server 102, FIG. 1) or another system entity. Desirably, the location object instance ID field 614 is encrypted, in an embodiment in which portions of tracer 600 are protected using encryption. In an alternate embodiment, the location object instance ID field 614 may not be encrypted.

Creation date field 616 may include a location object instance timestamp, which indicates when the location object instance was created (or some subsequent time). In an embodiment, a location object instance timestamp is stored in creation date field 616 by a service provider (e.g., service provider 114, 116, FIG. 1), although it alternatively may be stored by a location service server (e.g., location service server 102, FIG. 1) or another system entity. Desirably, the creation date field 616 is encrypted, in an embodiment in which portions of tracer 600 are protected using encryption. In an alternate embodiment, the creation date field 616 may not be encrypted. In still another alternate embodiment, the location object instance timestamp may be stored in the location object instance ID field 614, and a separate creation date field 616 may be excluded.

Tracer protection information field 618 may include information that enables the tracer 600 or portions thereof to be "protected." In one embodiment, the tracer protection information field 618 may include an integrity key and/or checksum, which is calculated based on the contents of one or more other tracer fields, and which enables a later determination of whether or not those tracer fields have been modified. In another embodiment, the tracer protection information field 618 may also or alternatively include an encryption key identifier, which includes or identifies an encryption key that was used to encrypt one or more other tracer fields, thus enabling later decryption of those tracer fields. In other embodiments, a tracer may be sent "in the clear" (e.g., unprotected), and the tracer protection information field 618 may be excluded. In an embodiment, tracer protection information (e.g., an integrity key, checksum, encryption key, or other information) is stored in tracer protection information field 618 by a system entity that applies the protection, such as a location service server (e.g., location service server 102, FIG. 1), although it alternatively may be stored by a service provider (e.g., service provider 114, 116, FIG. 1) or another system entity. Desirably, the tracer protection information field 618 is not encrypted, in an embodiment in which portions of tracer 600 are protected using encryption.

The location object tracer 600 of FIG. 6 is illustrated in an unencrypted format. It is to be understood that, in embodiments in which the tracer is encrypted (or otherwise scrambled or compressed), the information included within the tracer fields may not be arranged in a sequential order. In addition, it is to be understood that the various fields may be arranged in different orders than that illustrated, and/or certain ones of the fields may be combined together, and/or data within a single field may be represented in multiple fields, and/or more, fewer and/or different fields may be included within a tracer.

Referring also to FIG. 3 and block 308, upon generating or retrieving a location object, the service provider may then add data to certain tracer fields, as described previously in conjunction with FIG. 6. The service provider may then send the location object (with the tracer) to the server, as indicated by LO with tracer message 406 (FIG. 6).

Figure 4:
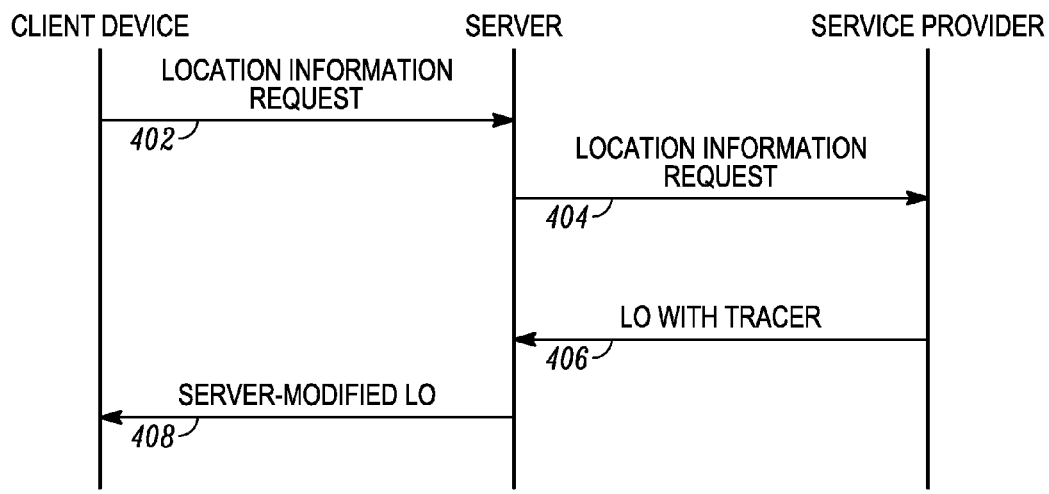
FIG. 4 is a communication flow diagram illustrating messages exchanged between system entities during the process of obtaining a location object, in accordance with an example embodiment.

In block 310, the server receives the location object from the service provider. In an embodiment, the server may then add data to certain tracer fields, as described previously in conjunction with FIG. 6. In an embodiment, the server also may "protect" the tracer and/or portions thereof. In one embodiment, the server may add an integrity key and/or checksum to the tracer (e.g., in tracer protection field 618, FIG. 6), which enables a later determination of whether or not the tracer has been modified. In another embodiment, the server may encrypt the tracer or portions thereof, and may add the encryption key to the tracer (e.g., in tracer protection field 618, FIG. 6). Other means of protecting the tracer may be used, in other embodiments. In another embodiment, however, the tracer may not be protected, but rather may be sent "in the clear." Upon completing modifications to the tracer (e.g., filling various tracer fields and/or protecting the tracer), the server sends the server-modified location object to the client device, as indicated by server-modified LO message 408 (FIG. 4).

In block 312, the client device receives and parses the server-modified location object. The client device may also store the location object in temporary or volatile storage. In an embodiment, the client's receipt of the location object may be considered a loggable, "location object-based action." In an embodiment, the action of receiving a location object, along with other actions performed with respect to the location object, may be documented by the client device in a location object usage log, as mentioned previously.

As used herein, a "location object-based action" may be defined as an action that is performed by a client device (e.g., in response to user interface inputs) and/or performed by a client-side location application or other software program. For example, but not by way of limitation, location object-based actions may include receiving a location object from another system entity ("receive action"), initiating a telephone call to a telephone number contained within a location object ("call action"), displaying information pertaining to a sponsor entity identified in a location object ("view action"), displaying mapping information that indicates a physical location defined by location information within a location object ("mapping action"), sending a location object or information contained therein to another system entity ("send action"), performing an action to save a location object in non-volatile memory on the client device in a later-accessible manner ("persistent save action"), initiating a search (e.g., a point-of-interest search) based on information within a location object ("search action"), initiating an instance of a navigation application to provide navigation instructions to a physical location defined by location information within a location object ("navigation action"), and generating an arrival-type navigation alert, which indicates that the client device has arrived at a physical location defined by location information within a location object ("arrival action"). In other embodiments, more, fewer or different location object-based actions may be defined by and recognized within a system.

In an embodiment in which receipt of a location object is a system-recognized, location object-based action, the client device may save information regarding the action in a location object usage log. In an embodiment, a location object usage log is a data structure (e.g., a buffer), stored in non-volatile memory of the client device, which includes information regarding location object-based actions performed by the client device with respect to received location objects (e.g., the "usage" of received location objects). In an embodiment, indicating that a location object-based action has occurred (e.g., a receive action) includes generating an entry (e.g., a record) in the location object usage log, which includes the tracer for the location object that was acted upon, along with an indication of the action that was performed (e.g., the location object usage information), among other things. In an embodiment in which all of a portion of the tracer is encrypted, the encrypted tracer information may be stored, in the entry, in conjunction with the location object usage information.

The location object usage log may be updated each time the client device performs a location object-based action, in an embodiment. Accordingly, a usage log entry (e.g., a record) may be generated in the location object usage log each time the client device performs a location object-based action. Alternatively, an existing usage log entry corresponding to a particular location object may be updated to indicate that an additional action has been performed with respect to that location object. As will be described in detail later, the usage information included within a location object usage log may be reported to a server (e.g., location service server 102, FIG. 1) either periodically, in response to some reporting event, or both. In an embodiment, a reporting event may be the performance of a location object-based action, and a client device may report location object-based actions as they occur (e.g., a client device may send information describing a location object-based action to the server each time such an action is performed). In such an embodiment, maintenance of a location object usage log may or may not be performed.

Figure 7:
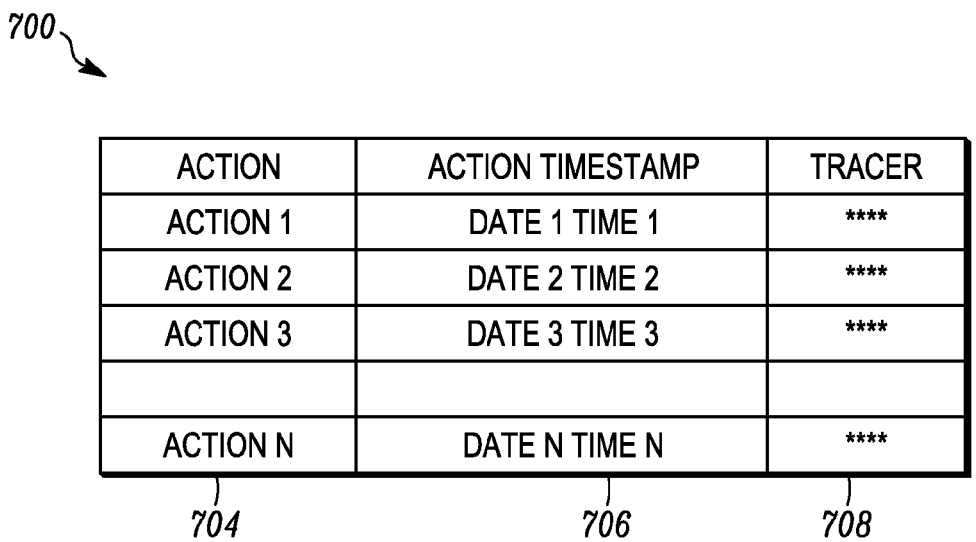
FIG. 7 is a diagram of a location object usage log, in accordance with an example embodiment.

FIG. 7 is a diagram of a location object usage log 700, in accordance with an example embodiment. Location object usage log 700 may include multiple records, and each record may correspond to a location object-based action, which has been performed by the client device and logged in the location object usage log 700. In an embodiment, each record includes a description of the action that was performed within an action field 704, a timestamp within a timestamp field 706, and a copy of all or a portion of the tracer that is associated with the location object that was acted upon, within a tracer field 708.

In an embodiment, each time a location object-based action is performed, a new record is created in location object usage log 700, a then-current time is inserted into the timestamp field 706 of the new record, and all or a portion of the tracer (e.g., tracer 600, FIG. 6) associated with the location object that was acted upon is copied into the tracer field 708 of the new record. In another embodiment, if a record has already been created for a particular location object, the record may be updated when subsequent location object-based actions are performed with respect to the location object (e.g., additional actions may be added to the action field 704. In still another embodiment, a record may be created only when a tracer and/or the corresponding location object has one or more particular characteristics. For example, when a location object-based action is performed, the client device may determine whether the location object corresponds to a sponsor entity (e.g., sponsor entity 130-134, FIG. 1), and may bypass creation of a new record when it does not. This determination may be made, for example, by the client device evaluating the information within a sponsored link indicator field (e.g., sponsored link indicator field 604, FIG. 6).

Location object-based actions 704 performed by the client device may be stored in the location object usage log 700 (or reported to a server or service provider) in a coded format, in an embodiment, although the information may be stored (or reported) in an ASCII format or some other uncompressed format, in other embodiments. For example, the system may have a known code associated with each type of location object-based action, and the known codes may be known to the client device and to the server. Table 1, below, illustrates an example of a table of location object-based action codes ("action code") associated with each of a plurality of types of location object-based actions:

| Action Code | Action |
|---|---|
| 1 | receive action |
| 2 | call action |
| 3 | view action |
| 4 | mapping action |
| 5 | send action |
| 6 | save action |
| 7 | search action |
| 8 | navigation action |
| 9 | arrival action |

Referring again to FIG. 3, a determination may be made, in block 314, whether another location object-based action has occurred, with respect to a location object that was previously received by the client device. This determination may be true, for example, each time the client device performs a system-recognized, location object-based action, such as the actions described previously. When the client device has performed another location-object based action, then in block 316, the client device may update the location object usage log to indicate that the action has been performed. In an embodiment, updating the location object usage log includes generating an additional entry in the location object usage log, which includes the location object tracer and an indication of the action that was performed, among other things. In another embodiment, updating the location object usage log may include updating a previously-generated entry to indicate that an additional action has been performed. The process of updating the location object usage log may continue to be performed indefinitely, as indicated in FIG. 3, or until some interrupt event occurs.

Figure 8:
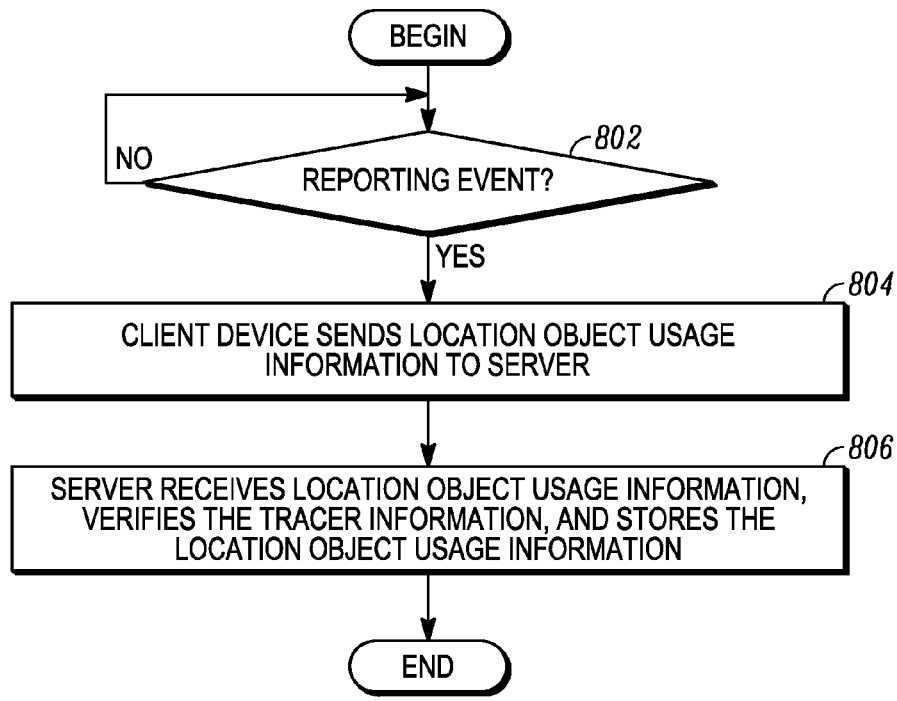
FIG. 8 is a flowchart of a method for a client device to provide information to a server, which describes location object-based actions performed by the client device, in accordance with an example embodiment.

As mentioned previously, a client device may, on occasion, report information describing location object-based actions performed by the client device to a server (e.g., location service server 102, FIG. 1) or another system entity. FIGS. 8-11 illustrate additional details regarding a client device reporting information describing location object-based actions performed by the client device. More particularly, FIG. 8 is a flowchart of a method for a client device to provide information to a server, which describes location object-based actions performed by the client device, in accordance with an example embodiment. For enhanced understanding, FIG. 8 should be viewed in conjunction with FIG. 9, which is a communication flow diagram illustrating messages exchanged between system entities during the process of reporting location object-based actions, in accordance with an example embodiment.

Referring first to FIG. 8, the method may begin when a client device determines that a reporting event has occurred, in block 802. In various embodiments, reporting events may be client generated, system generated or both. Client-generated reporting events may include, for example but not by way of limitation, collection of a predetermined quantity of location object usage information since the client device last sent a report, the location object usage log on the client device reaching a predetermined size, performance of a predetermined number of location object-based actions (e.g., an integer number from 1 to 1000), the elapse of a predetermined period of time (e.g., a 24-hour period or some other period of time), the client device's entry into a particular operational state (e.g., power up or idle, for example), and/or other events whose occurrence may be determined by the client device.

System-generated reporting events may include, for example but not by way of limitation, the client device's receipt of a report request message from a server (e.g., location service server 102, FIG. 1) or other system entity, and/or other events whose occurrence may be initiated by the server or a system entity other than the client device. In an embodiment in which a reporting event is a system-generated reporting event, the server may send a location object usage information request message to the client device, as indicated by LO usage information request message 902 (FIG. 9).

Figure 9:
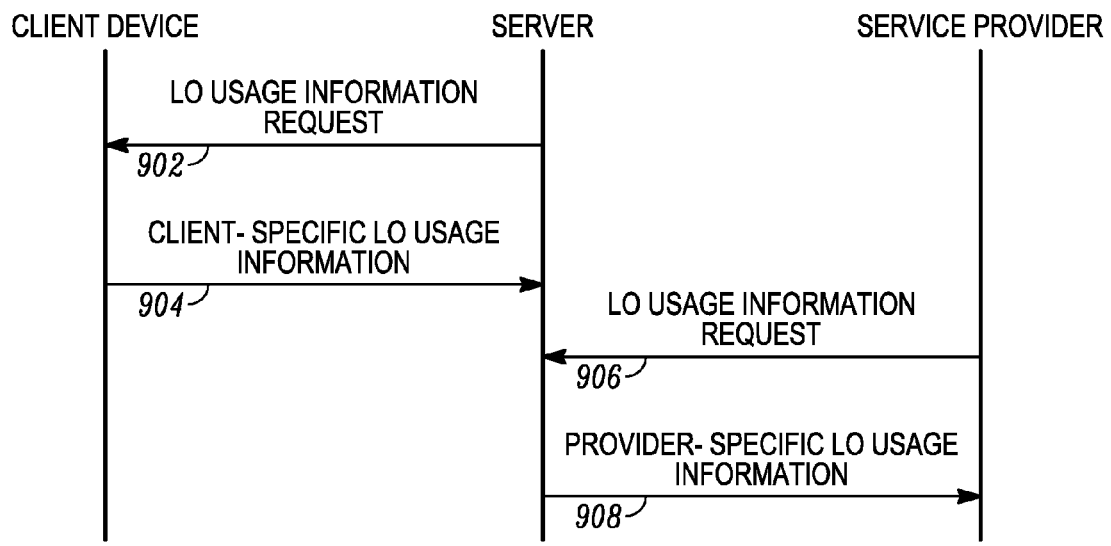
FIG. 9 is a communication flow diagram illustrating messages exchanged between system entities during the process of reporting location object-based actions, in accordance with an example embodiment.

When the client device has determined that a reporting event has occurred, the client device may send location object usage information and the tracer information associated therewith to the server, in block 804, as indicated by client-specific LO usage information message 904 (FIG. 9). As used herein, the term "reported tracer information" refers to tracer information that is reported to a server (or other system entity) by a client device (or other system entity), as opposed to tracer information that forms a portion of a location object, even though the content of this information may be (or may not be) the same. Reported tracer information that is reported from a client device to a server may more specifically be referred to as "client-reported tracer information." In an embodiment, the client device may retrieve location object usage information and tracer information from the location object usage log (or other data structure), and may generate a message that includes the retrieved location object usage information and tracer information. The retrieved location object usage information and tracer information may include all or a subset of the information within the location object usage log, for example. In an embodiment, the information within the location object usage log that is reported either is cleared from the location object usage log or is marked as having been reported. In an alternate embodiment, pointers into the location object usage log may indicate blocks of data that either have or have not been reported, and the client device may permit that data that has been reported to be overwritten.

In an embodiment, the client device sends location object usage information and tracer information to the server (or other system entity) in the form of a client location object usage report message. The location object usage information and tracer information may be sent to a server in a substantially unaltered form from how it was stored in the location object usage log, or it may be sent in a reformulated format which includes more, less, and/or rearranged information. The information may be sent in a consolidated format with duplicative information removed, in an embodiment, and/or may be otherwise compressed. Finally, the information may or may not be encrypted or scrambled, prior to being sent.

Figures 10, 11:
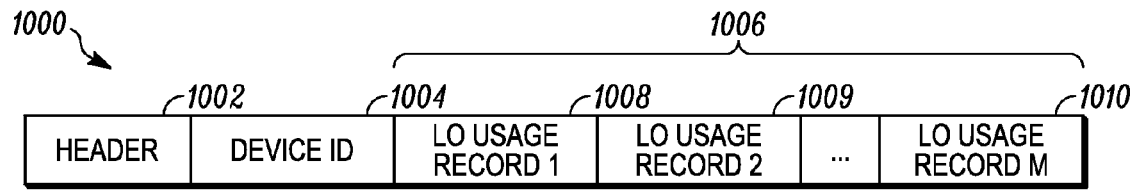
FIG. 10 is a diagram of a client location object usage report message, in accordance with an example embodiment.
FIG. 11 is a diagram of location object usage information stored within a location object usage tracking database, in accordance with an example embodiment.

FIG. 10 is a diagram of a client location object usage report message 1000, in accordance with an example embodiment. Location object usage report message 1000 may include, for example, a header field 1002, device ID field 1004, and a location object usage information field 1006, which may include one or more location object usage records 1008, 1009, 1010, in an embodiment.

Header field 1002 may include information that enables a determination of the type of message (e.g., a location object usage report message), and a message identifier (e.g., a unique identifier of the message), among other things. In addition, header field 1002 may indicate the size of the message, the data portion of the message (e.g., the device ID field 1004 and the location object usage information field 1006), and/or other information that enables a system entity to parse or decode the message.

Device ID field 1004 may include a device identifier, which uniquely identifies the client device within the network or system. Location object usage information field 1006 includes indicators of location object-based actions and tracers stored within the location object usage log (e.g., location object usage log 700, FIG. 7). In an embodiment, each of location object usage records 1008-1010 may include location object usage information corresponding to one or more location object usage records within the location object usage log. For example, each location object usage record 1008-1010 may include an action, timestamp, and tracer included within one record of the location object usage log. In an alternate embodiment, the location object usage information field 1006 and/or each location object usage record 1008-1010 may include consolidated and/or reorganized indicators of the location object-based actions and tracers stored within the location object usage log.

Referring again to FIG. 8, the server receives the location object usage information and the client-reported tracer information (e.g., a client location object usage report message) from the client device, in block 806. In an embodiment, the server may then verify the tracer information for some or all of the tracers received. In an embodiment in which the tracer information is encrypted, this may include decrypting the tracer information. In an embodiment in which the tracer information includes an integrity key, this may include evaluating the tracer information in conjunction with the integrity key to determine whether the tracer information has been modified by an unauthorized source. Assuming that the tracer information has been properly verified, the server may then store the location object usage information. In an embodiment, the location object usage information associated with any tracer information that has not been properly verified is not stored.

In an embodiment, the server stores location object usage information and at least some of the client-reported tracer information in a location object usage tracking database (e.g., LO usage tracking database 124, FIG. 1), and the method may end. As mentioned previously, a location object usage tracking database may be a relational database (or a flat file), which includes location object usage information and client-reported tracer information for a plurality of client devices. In an embodiment, the location object usage information and its associated client-reported tracer information may be stored, related, and/or accessed based on any one or more parameters, including but not limited to, provider ID, sponsor ID, sponsor type, location object ID, location object-based action or action code, action timestamp, location object instance ID, location object name, client device ID, report timestamp, and/or other parameters associated with the information stored within the location object usage tracking database.

FIG. 11 is a diagram of location object usage information stored within a location object usage tracking database 1100, in accordance with an example embodiment. Location object usage tracking database 1100 may include multiple records, indicated by record numbers ("Record No.") 1 to X in column 1102. Each record may correspond to one or more location object-based actions, which have been reported by client devices (e.g., in client location object usage report messages 1000, FIG. 10). In an embodiment, each record includes a record number within a record number field 1102, a device ID identifying the client device that reported the information 1104, a description of the action that was performed within an action field 1106, one or more timestamps within a timestamp field 1108, and a copy of all or a portion of the client-reported tracer information that is associated with the location object that was acted upon, within a tracer information ("tracer info") field 1110.

In an embodiment, each time location object usage information is received from a client device (e.g., in a client location object usage report message 1000, FIG. 10), one or more new records are created in location object usage tracking database 1100, and a then-current time is inserted into the timestamp field 1108 of the new records. The action timestamp (e.g., action timestamp 706, FIG. 7) that was reported by the client device in the location object usage information also or alternatively may be inserted into the timestamp field 1108, in various embodiments.

In addition, for each record, the reported action may be indicated in the action field 1106, and tracer information that includes all or a portion of the tracer (e.g., tracer 600, FIG. 6) associated with the location object that was acted upon may be copied into the tracer information field 1110 of the new record. In an embodiment, the tracer information is stored in an unencrypted format (e.g., when an encrypted tracer is received, it is decrypted prior to storing the tracer information). The tracer information may include one or more IDs, which may include at least the provider ID (e.g., provider ID 606, FIG. 6), sponsor ID (e.g., sponsor ID 608, FIG. 6), and the location object ID (e.g., location object ID 612, FIG. 6), in an embodiment. In other embodiments, other tracer information also may be stored in the tracer information field 1110. In another embodiment, if a record has already been created for a particular location object (as indicated by the location object ID), the record may be updated when subsequent location object-based actions are reported with respect to the location object (e.g., additional actions may be added to the action field 1106). In still another embodiment, a record may be created only when a tracer and/or the corresponding location object has one or more particular characteristics. For example, when a location object-based action is reported, the server may determine whether the location object corresponds to a sponsor entity (e.g., sponsor entity 130-134, FIG. 1), and may bypass creation of a new record when it does not. This determination may be made, for example, by the server evaluating the information within a sponsored link indicator field (e.g., sponsored link indicator field 604, FIG. 6) of the tracer.

As mentioned previously, a server may, on occasion, report information describing location object-based actions performed by client devices to a service provider (e.g., service provider 114, 116, FIG. 1) or another system entity. This information may include, for example, information within the location object usage tracking database 1100, FIG. 11.

FIG. 12 is a flowchart of a method for a server to provide information to a service provider, which describes location object-based actions performed by one or more client devices, in accordance with an example embodiment. For enhanced understanding, FIG. 12 should be viewed in conjunction with FIG. 9, which was introduced earlier. Referring first to FIG. 12, the method may begin when a server determines that a reporting event has occurred, in block 1202. In various embodiments, reporting events may be server generated, service provider generated or both. Server-generated reporting events may include, for example but not by way of limitation, collection of a predetermined quantity of location object usage information associated with a particular service provider since the server last sent a report to the service provider, the elapse of a predetermined period of time (e.g., a 24-hour period or some other period of time), and/or other events whose occurrence may be determined by the server. Service provider-generated reporting events may include, for example but not by way of limitation, the server receiving a report request message from a service provider or other system entity, and/or other events whose occurrence may be initiated by the service provider or a system entity other than the server. In an embodiment in which a reporting event is a service provider-generated reporting event, the service provider may send a location object usage information request message to the server, as indicated by LO usage information request message 906 (FIG. 9).

When the server has determined that a reporting event has occurred, the server may send location object usage information and tracer information to the service provider, in block 904, as indicated by service provider-specific LO usage information message 908 (FIG. 9). As used herein, the term "server-reported tracer information" refers to tracer information that is reported to a service provider by a server (or other system entity), as opposed to tracer information that forms a portion of a location object, even though the content of this information may be (or may not be) the same. In an embodiment, the server may retrieve location object usage information and tracer information from the location object usage tracking database (e.g., LO usage tracking database 124, FIG. 1), and may generate a message that includes the retrieved location object usage information and tracer information. The retrieved location object usage information and tracer information may include all or a subset of the information within the location object usage tracking database, for example. In an embodiment, the information within the location object usage tracking database that is reported to the service provider is specific to that service provider, meaning that the location object-based action information reported to the service provider corresponds to location objects having tracer information that includes the service provider's ID in the provider ID field (e.g., provider ID field 606, FIG. 6). Once location object usage information has been reported to a service provider, it either is cleared from the location object usage tracking database or is marked as having been reported. In an alternate embodiment, pointers into the location object usage tracking database may indicate blocks of data that either have or have not been reported, and the server may permit that data that has been reported to be overwritten.

In an embodiment, the server sends location object usage information and tracer information to the service provider (or other system entity) in the form of a service-provider location object usage report message. The location object usage information and tracer information may be sent to a service provider in a substantially unaltered form from how it was stored in the location object usage tracking database, or it may be sent in a reformulated format which includes more, less, and/or rearranged information. The information may be sent in a consolidated format with duplicative information removed, in an embodiment, and/or may be otherwise compressed. In addition, the information may include complete, unaltered tracer information, or it may exclude certain portions of the tracer information. Finally, the information may or may not be encrypted or scrambled, prior to being sent.

In an embodiment, the server may initiate billing for the provider-specific location object usage information. This may include, for example, sending information to a "server billing processor" regarding the identity of the service provider to whom the information was reported, along with information regarding the quantity and or nature of provider-specific location object usage information that was reported. A server billing processor may include, for example, a processing entity associated with the server, which is adapted to evaluate "reporting information" describing reported location object usage information, and to initiate billing events based on the reporting information. The term "server," as used herein, may be used interchangeably to mean a server and/or a server billing processor, which may or may not be distinct processing entities. In an embodiment, the server billing processor may initiate the generation of a billing event, which may include the generation and transmission of an electronic or paper bill to a sponsor entity, and/or the initiation of a funds transfer from the sponsor entity to the service provider. In this manner, the server may monetize its collection and provision of location object-based action information to the service provider.

Referring again to FIG. 12, the service provider (or other system entity) receives the service-provider specific location object usage information and server-reported tracer information (e.g., a service-provider location object usage report message) from the server, in block 1206. The service provider may then verify the received location object usage information.

In an embodiment, a service provider billing processor associated with the service provider may then initiate a sponsor billing event based on the received location object usage information and server-reported tracer information. The term "service provider," as used herein, may be used interchangeably to mean a service provider and/or a service provider billing processor, which may or may not be distinct processing entities. For example, a service provider billing processor may determine sponsors who potentially should be billed, based on the server-reported tracer information. For example, a service provider billing processor may identify, as sponsors potentially to be billed, a set of sponsors who were identified in the server-reported tracer information of those location objects that were reported as having been used. For example, these sponsors may be or may have been identified in the sponsor ID fields (e.g., sponsor ID field 608, FIG. 6) of the tracers corresponding to location objects that have been used.

Once the set of sponsor entities potentially to be billed have been determined, the service provider billing processor may determine billing amounts for each identified sponsor entity based on the location object usage information. In an embodiment, the service provider billing processor may implement a tiered billing schedule to determine billing amounts for each identified sponsor entity. For example, in an embodiment, a tiered billing structure may specify different billing amounts for different types of actions, and/or for different sponsors and/or types of sponsors.

FIG. 13 is an example of a tiered billing schedule 1300 that may be applied by a service provider billing processor (or other system entity), in accordance with an example embodiment. Various types of location object-based actions are listed in the leftmost column 1302 of schedule 1300, each of which was described previously. For a first sponsor (or type of sponsor), "Sponsor A," fees (in dollars) corresponding to each type of action are listed in column 1304. Similarly, for second and third sponsors (or types of sponsors), "Sponsor B" and "Sponsor C," other fees corresponding to each type of action are listed in columns 1306 and 1308. For example, Sponsor A may correspond to one or more retail clothing stores associated with a first sponsor entity, Sponsor B may correspond to one or more fast food restaurants associated with a second sponsor entity, and Sponsor C may correspond to one or more luxury automobile dealers associated with a third sponsor entity. Each sponsor or type of sponsor may be charged different fees for different location object-based actions, as mentioned above. For example fees specified in the bottom row, which corresponds to fees for an arrival instruction issued by a navigation application, may be the lowest for Sponsor B (fast food restaurant), higher for Sponsor A (retail clothing store), and the highest for Sponsor C (luxury automobile dealership). In addition, the fees corresponding to an arrival instruction (bottom row) may be substantially higher than the fees corresponding to a receive action (top row), because the likelihood that the sponsor may realize a sale is substantially higher when a user has arrived at a sponsor location than when the user's client device has merely received a location object corresponding to the sponsor location.

Referring again to block 1206 of FIG. 12, billing amounts for each sponsor entity may be determined by determining and accumulating the fees for all location object-based actions corresponding to each sponsor entity, using a billing schedule, such as the tiered billing schedule of FIG. 13. In an embodiment, the service provider billing processor may initiate the generation of a billing event for each sponsor entity, which may include the generation and transmission of an electronic or paper bill to each identified sponsor entity, which specifies the billing amount determined for each sponsor entity. In an alternate embodiment, a billing event may include the initiation of a funds transfer from the sponsor entity to the service provider, where the amount of the funds transfer may include all or a portion of the billing amount determined for the sponsor entity. In this manner, the service provider may monetize the client device usage of the location objects that it initially provided.

Various embodiments may be performed on client devices (e.g., client devices 103-109, FIG. 1) and networked computers (e.g., location service server 102 and service providers 114, 116, FIG. 1), as discussed previously, and each may include hardware, firmware and software adapted to perform various functions relating to location objects, such as those described above. The networked computers (e.g., location service server 102 and service providers 114, 116, FIG. 1) may include centralized or distributed processing subsystems, and may also include or be adapted to access memory storage devices and systems, and/or databases. Client devices (e.g., client devices 103-109 may include various configurations of hardware, each of which is adapted to perform the functions of the particular type of client device and to communicate over one or more types of wired or wireless networks.

FIG. 14 is a simplified block diagram of a client device 1400, in accordance with an example embodiment. In an embodiment in which device 1400 is adapted to communicate over a wireless network, device 1400 includes at least one wireless network interface 1402, at least one processing subsystem 1404, at least one data storage subsystem 1406, at least one user interface (UI) input device 1408, and at least one UI output device 1410, in an embodiment. In an embodiment in which device 1400 is adapted to communicate over a wired network, device 1400 may also or alternatively include a wired network interface 1403. Device 1400 may also include a battery subsystem 1412, in an embodiment. In other embodiments, device 1400 may include one or more additional or different elements.

Wireless network interface 1402 is adapted to receive and/or transmit messages over a wireless network (e.g., a cellular network, radio network, and/or other types of wireless networks). In an embodiment, wireless network interface 1402 may include at least one antenna and other apparatus for receiving signals (e.g., messages that include location objects) from the air interface and for transmitting signals (e.g., messages that include location object usage information) over the air interface. Wired network interface 1403 is adapted to receive and/or transmit messages over a hardwired network (e.g., the internet, a WAN, a LAN, a PSTN, and/or other types of networks). In an embodiment, wired network interface 1403 may include at least one port and other apparatus for receiving signals (e.g., messages that include location objects) from the wired network, and for transmitting signals (e.g., messages that include location object usage information) over the wired network.

Processing subsystem 1404 is adapted to perform various method embodiments, as described previously. In particular, processing subsystem 1404 is adapted to determine whether a location object-based action has been performed in which a location object that includes tracer information has been used by the client device 1400. When a location object-based action has occurred, processing subsystem 1404 may initiate storage of the tracer information and location object usage information into data storage subsystem 1406.

Processing subsystem 1404 may include at least one processing device (e.g., a general purpose or special purpose processor) and additional circuitry adapted to interface processing subsystem 1404 with other elements of device 1400. Processing subsystem 1404 is operatively coupled to wireless network interface 1402 and/or wired network interface 1403, in an embodiment, and accordingly may receive data from and provide data to wireless network interface 1402 and/or wired network interface 1403. The data may include, for example, location objects and/or location object usage information. Processing subsystem 1404 also is operatively coupled to UI input device 1408 and UI output device 1410, in an embodiment, and accordingly may receive information that indicates user inputs, and may provide information (e.g., displays depicting location information within location objects).

Processing subsystem 1404 may store data to and/or retrieve data from the at least one data storage subsystem 1406. Data storage subsystem 1406 may include, for example, one or more volatile or non-volatile storage components, such as random access memory (RAM), read only memory (ROM), numerous variations of those types of memories, and/or other types of storage. In an embodiment, the at least one data storage subsystem 1406 is adapted to store information (e.g., location object usage information and tracer information) regarding location object-based actions performed by device 1400, among other things.

The at least one UI input device 1408 may include one or more of various devices selected from a group of UI input devices that includes, but is not limited to a microphone, keypad, keyboard, trackball, pointing device, and/or touchscreen, among other things. In an embodiment, the at least one user input device 1408 is adapted to enable the user to cause device 1400 to perform various location object-based actions by providing input prompts and receiving user inputs (e.g., mouse clicks, entered data, etc.).

The at least one UI output device 1410 may include one or more of various devices selected from a group of UI output devices that includes, but is not limited to a speaker, display device, touchscreen, mechanical vibration device, and/or indicator light, among other things. In an embodiment, the at least one user output device 1410 is adapted to depict location information within location objects, as is discussed in detail above.

The at least one battery subsystem 1412 may be configured to accept at least one rechargeable or disposable battery, in an embodiment, and accordingly may include a battery housing (not illustrated), which may hold the at least one battery. The at least one battery subsystem 1412 may be operatively coupled to any one or more of the at least one processing subsystem 1404, the at least one data storage subsystem 1406, the at least one wireless network interface 1402, the at least one wired network interface 1403, the at least one user interface input device 1408, and/or the at least one user interface output device 1410, in an embodiment, in order to provide power to these device elements. In an alternate embodiment, device 1400 may not include a battery subsystem, and instead may receive line power.

The sequence of the text in any of the claims does not imply that process steps must be performed in a temporal or logical order according to such sequence unless it is specifically defined by the language of the claim. The process steps may be interchanged in any order without departing from the scope of the inventive subject matter as long as such an interchange does not contradict the claim language and is not logically nonsensical. Furthermore, numerical ordinals such as "first," "second," "third," etc. simply denote different singles of a plurality and do not imply any order or sequence unless specifically defined by the claim language.

Furthermore, words such as "connected" or "coupled to" used in describing a relationship between different elements do not imply that a direct physical connection must be made between these elements. For example, two elements may be connected to each other physically, electronically, logically, or in any other manner, through one or more additional elements, without departing from the scope of the inventive subject matter.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the inventive subject matter.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter, it being understood that various changes may be made in the function and arrangement of elements described in an exemplary embodiment without departing from the scope of the inventive subject matter as set forth in the appended claims and their legal equivalents.

What is claimed is:

1. A server comprising:
   a network interface configured for receiving a client-generated location-information request from a client device, wherein the location-information request includes parameters for obtaining location information; and
   a processing subsystem configured for:
      obtaining one or more location objects in response to receiving the client-generated location-information request, wherein a location object of the one or more location objects includes tracer information in one or more tracer fields;
      sending, via the network interface, the one or more location objects to the client device; and
      receiving, via the network interface, location-object usage information and client-reported tracer information from the client device, wherein the location-object usage information describes one or more location object-based actions that have been performed by the client device using the one or more location objects, and wherein the client-reported tracer information includes tracer information associated with the one or more location objects.

2. The server of claim 1 wherein obtaining the one or more location objects comprises:
   generating a server-generated location-information request;
   sending, via the network interface, the server-generated location-information request to a service provider; and
   receiving, via the network interface, the one or more location objects from the service provider in response to the server-generated location-information request.

3. The server of claim 1 wherein the processing subsystem is further configured for:
   storing a provider identifier in a provider identifier field of the tracer fields.

4. The server of claim 1 wherein the processing subsystem is further configured for:
   protecting the tracer information by encrypting portions of the tracer information.

5. The server of claim 1 wherein the processing subsystem is further configured for:
protecting the tracer information by storing an integrity key in a tracer-protection information field of the tracer fields.

6. The method of claim 1 wherein the processing subsystem is further configured for:
sending, via the network interface, a location-object usage information request to the client device, wherein the location-object usage information and the client-reported tracer information is received from the client device in response to the location-object usage information request.

7. The method of claim 1 wherein the processing subsystem is further configured for:
storing the location-object usage information and the client-reported tracer information in a database.

8. The method of claim 1 wherein the processing subsystem is further configured for:
validating the client-reported tracer information by decrypting the client-reported tracer information.

9. The method of claim 1 wherein the processing subsystem is further configured for:
validating the client-reported tracer information using an integrity key within the client-reported tracer information.

10. A service provider comprising:
a network interface configured for receiving location-object usage information and reported tracer information from another system entity, wherein the location-object usage information describes one or more location object-based actions that have been performed by one or more client devices using one or more location objects, and wherein the reported tracer information includes an identification of one or more sponsor entities associated with the one or more location objects; and
a processing subsystem configured for:
initiating a billing event based on an evaluation of the location-object usage information and the reported tracer information.

11. The service provider of claim 10 wherein initiating the billing event comprises:
identifying, as sponsor entities to be billed, a set of sponsor entities identified in the reported tracer information of the one or more location objects that were used; and
determining billing amounts for each sponsor entity of the set of sponsor entities.

12. The service provider of claim 11 wherein determining billing amounts comprises:
implementing a tiered billing schedule to determine the billing amounts.

13. The service provider of claim 11 wherein the processing subsystem is further configured for:
generating and transmitting electronic or paper bills to each sponsor entity of the set of sponsor entities, which bills specify the billing amounts determined for each sponsor entity of the set of sponsor entities.

14. The service provider of claim 11 wherein the processing subsystem is further configured for:
generating and transmitting electronic or paper bills to a sponsor entity of the set of sponsor entities, which bills specify a billing amount determined for the sponsor entity of the set of sponsor entities.

15. The service provider of claim 11 wherein the processing subsystem is further configured for:
initiating a funds transfer from a sponsor entity of the set of sponsor entities, wherein an amount of the funds transfer may include all or a portion of a billing amount determined for the sponsor entity of the set of sponsor entities.

* * * * *